United States Patent Office 3,780,169
Patented Dec. 18, 1973

3,780,169
MANUFACTURE OF BERYLLIUM HYDRIDE
David R. Carley, Baton Rouge, La., assignor to Ethyl Corporation, New York, N.Y.
No Drawing. Filed Sept. 26, 1962, Ser. No. 227,632
Int. Cl. C01b 6/00
U.S. Cl. 423—645                                    18 Claims

ABSTRACT OF THE DISCLOSURE

The invention relates to a process for the preparation of beryllium hydride by reacting a diorganoberyllium compound with hydrogen under elevated temperature and pressure.

---

This invention relates to a novel process for the manufacture of beryllium hydride, said process being characterized by economy, simplicity and high yield.

Beryllium hydride has been suggested as a catalyst for olefin polymerization, but its expense and the difficulty of obtaining it in a state of adequate purity have militated against such use. Hitherto, beryllium hydride has been prepared either by the reduction of beryllium compounds with lithium aluminum hydride, specifically the reaction in ether solution of dimethyl beryllium with lithium aluminum hydride, or by the pyrolysis of neat di-t-Bu-beryllium etherate. These methods are tedious and often result in considerable purity variation when not scrupulously controlled. Furthermore, they are not readily adaptable to scale-up for obtaining significant quantities of the hydride.

Accordingly, it is an object of this invention to provide a novel and effective method for the preparation of beryllium hydride. Another object is to provide a novel and effective method for the preparation of beryllium hydride in high yield and purity. Another object is to provide a more direct, efficient and economical method for the preparation of beryllium hydride which is free from the marked disadvantages of earlier methods. A further object is to provide a method for the preparation of beryllium hydride from readily available or readily prepared raw materials. A still further object is to provide a method for the preparation of beryllium hydride which is readily adaptable to scale-up operations. These and other important objects of this invention will become apparent hereinafter.

The novel process of this invention is a hydrogenolysis process wherein a diorganoberyllium compound is reacted with hydrogen under elevated temperature and pressure. The organic substituents attached to the beryllium of the diorganoberyllium compound may comprise alkyl radicals, aryl radicals, cycloalkyl radicals, aralkyl radicals, alkaryl radicals, or mixtures of any two of the foregoing. Of the foregoing organoberyllium compounds, those containing only alkyl substituents are preferred; those containing not more than 12 carbon atoms in each alkyl group are preferred even more and, of these, diethylberyllium is particularly preferred because the purity, in weight percent, of the beryllium hydride is decreased less by residual alkyl impurity of low than of high molecular weight. This is a significant factor in rocket fuels where weight considerations are of the highest importance. Reaction temperatures in the range of 125 to 225° C. are suitable and those in the range of 150 to 200° C. are particular preferred. Lower temperatures result in reaction rates which are so slow as to be impracticable and higher temperatures result in the occurrence of thermal decomposition and other side reactions, wtih the formation of considerable quantities of beryllium carbide and with resultant reduction in conversion to beryllium hydride. Reaction pressures may range from 500 p.s.i. or below to 15,000 p.s.i. or above, the most effective and desirable pressure range varying with the other reaction conditions.

The beryllium hydride product obtained by the reaction of this invention is a white solid, insoluble in ether, toluene and isopentane. The material is relatively stable up to about 200–225° C. It does not react visibly with air, oxygen or water at room temperature; however, it does react, though not violently, with aqueous hydrochloric acid.

The reaction of the invention can be carried out in the presence or absence of solvents. If solvents are used, they should be inert with respect to both reactants and products. Suitable solvents include hydrocarbons such as n-octane, trimethylhexane cyclohexane, benzene and toluene.

A preferred embodiment of the reaction of the present invention is the application thereto of the concept of temperature programming. At 10,000 p.s.i. of hydrogen, if the entire reaction is carried out at a temperature of about 150° C., side reactions are avoided almost completely, but the reaction rate is extremely slow and very low yields of the desired product are obtained. If, on the other hand, the entire reaction is carried out a temperature of about 200° C., the reaction rate is satisfactory but extensive formation occurs of such by-products as beryllium carbide and metallic beryllium and, again, the yield of the desired beryllium hydride is very low. It has been found, however, that if the reaction of the invention is caused to take place in two or more stages so that the reaction temperature does not substantially exceed 150° C. until the reaction has proceeded to a stage generally corresponding to the formation of the intermediate alkyl beryllium hydride and the temperature is then raised to about 200° C. for the remainder of the reaction period, relatively high yields of the desired product are obtained and the formation of undesired byproducts is largely avoided. At lower pressures, lower initial temperatures and/or more temperature stages may be required, e.g., at 2,000 p.s.i. of hydrogen, stages of 125°, 150°, 175° and 200° C. are used. Accordingly, a stepwise temperature-programmed operation of the type described constitutes an important embodiment of the present invention.

The hydrogenolysis reaction proceeds smoothly and with reasonable speed under the prescribed conditions, a period of 2 to 5 hours being normally sufficient to complete the first stage of the reaction and a period of 7 to 12 hours being sufficient for the second stage.

The dialkyl beryllium reactants can readily be prepared either by the action of the appropriate Grignard reagent on beryllium chloride dietherate or by the action of the corresponding dialkyl mercury compound on metallic beryllium. In the Grignard method, the separation of the products from the reaction mixture presents some difficulties. The dimethyl beryllium may be obatined by a process of ether distillation at atmospheric pressure, whereby ether continuously circulates carrying dimethyl beryllium from the reaction mixture to a receiver, excess ether than returning to the former via a condenser. The higher alkyls should be distilled from the reaction mixture at reduced pressure at as low a temperature as possible to minimize thermal decomposition.

The process of the invention exhibits a number of important advantages over previously described methods for the preparation of beryllium hydride. Specifically, a simpler procedure is provided and higher conversions are obtained. As compared with the method using lithium aluminum hydride as reducing agent, the method of the present invention employs cheaper reactants and is generally more economical. As compared with the pyrolysis method, the method of the invention is more rapid and more readily controlled and is more readily adaptable to scale-up operations.

The invention will be more fully understood by reference to the following illustrative examples in which all parts and percentages are by weight.

EXAMPLE I

Hydrogenolysis of dimethylberyllium in cyclohexane

Use was made of ether-free dimethylberyllium obtained by removing ether under vacuum from a measured volume of a standardized diethyl ether solution of dimethylberyllium. Hydrogen pressure was kept constant at 5,000 p.s.i. and the temperature at 180° C. for a reaction period of 66 hours. 3.6 g. of dimethylberyllium were charged in 25 ml. of cyclohexane solvent and 0.83 g. of solid precipitate was recovered. This precipitate analyzed 44.6 weight percent beryllium and upon hydrolysis evolved 85.8 mmoles of hydrogen per gram. This corresponds to a molar ratio of hydrogen to beryllium of 1.73, which is very close to the theoretical value for beryllium hydride.

When diphenylberyllium, dimethylcyclohexyl beryllium, and dibenzylberyllium are subjected to hydrogenolysis in cyclohexane solution in the manner described in the preceding examples, similar results are obtained.

EXAMPLE II

Hydrogenolysis of diisopropyl beryllium in cyclohexane

Using the general procedure of Example I, two runs were made in the temperature range of 150 to 160° C. at 5,000 p.s.i. hydrogen pressure for periods of 17 and 18 hours, respectively. The customary recovery procedure was employed—solids precipitated during reaction were filtered off and the filtrate was then evaporated to dryness under vacuum to recover any soluble materials. Experimental details are presented in the following table.

TABLE I.—HYDROGENOLYSIS OF DIISOPROPYLBERYLLIUM IN CYCLOHEXANE

|  | Run 1 | Run 2 |
|---|---|---|
| Reaction data [1] |  |  |
| Temperature, °C | 150–154 | 158 |
| Time, hr | 17 | 18 |
| (i-Pr)[2] Be chagged, g.[3] | 1.55 | 1.46 |
| Reaction precipitate, g | 0.22 | 0.18 |
| Solid residue from filtrate, g | 0.10 | [3] 0.13 |
| Analysis of Precipitate: [4] |  |  |
| Mole ratio: |  |  |
| Be | 1.0 | 1.0 |
| i-Pr | 0.12 | 0.06 |
| H | 1.73 | 1.87 |
| Calculated composition of precipitate: |  |  |
| Wt. percent: |  |  |
| BeH$_2$ | 52.6 | 57.8 |
| (i-Pr)$_2$Be | 32.2 | 14.9 |
| Unknown | 15.2 | 27.3 |

[1] All runs conducted at 5,000 p.s.i. H$_2$ pressure.
[2] Analysis of (i-Pr)$_2$Be:
  Run 1=82.9% (i-Pr)$_2$Be, 14.8% Et$_2$O.
  Run 2=93.2% (i-Pr)$_2$Be, no Et$_2$O.
[3] Contained only 4.37 mg. of Be.
[4] Values calculated from gases liberated on hydrolysis. All propane calculated as (i-Pr)$_2$Be and all H$_2$ as BeH$_2$. Run 1 was also hydrolyzed with DCl and the gas evolved was essentially all DH.

EXAMPLES III–VIII

Hydrogenolysis of diethylberyllium at about 11,000 p.s.i. of hydrogen, no solvent Unless otherwise noted, all reactions were run in a 110-ml. rocking type autoclave, but without rocking the autoclave. The reactant was placed in a vial (33 ml.) inside the autoclave (with noted exceptions), pressured to the desired pressure and then heated to the desired temperature. Examples V, VII and VIII employed the temperature programming principle described above. After the reaction period, the cooled autoclave was vented and opened and the vial containing the product was removed. In the experiments giving good quality BeH$_2$, the product was a white powder.

TABLE II

Hydrogenolysis of BeEt$_2$ at about 11,000 p.s.i. H$_2$, no solvent

| Example number | III | IV | V | | VI | | VII | | VIII | | | |
|---|---|---|---|---|---|---|---|---|---|---|---|---|
| Reaction data stage | | | I | II | I | II | I | II | I | II | III | IV |
| P.s.i. H$_2$ | 10,700 | 11,600 | 10,700 | 11,350 | 11,300 | 10,900 | 11,600 | 2,000 | 2,000 | 2,000 | 2,000 |
| °C | 150 | 200 | 150 | 200 | 200 | 150 | 200 | 125 | 150 | 175 | 200 |
| Hours | 40 | 66.5 | 4 | 10 | 10 | 4 | 10 | 4 | 4 | 4 | 10 |
| Ml. BeEt$_2$ | 5 | 5 | 2 | | | 2 | | | | | 2 |
| Other | | | (1) | | (2) | (1) | | | | | (1) |
| Product color | White | Black and white | White | | White | White | | | | | White |
| Product analysis: | | | | | | | | | | | | |
| Wt. percent: | | | | | | | | | | | | |
| BeH$_2$ | 66.7 | 21.8 | 77.3 | | 86.5 | 80.3 | | | | | 77.6 |
| Be | 3.5 | 28.5 | 4.4 | | 4.1 | 3.5 | | | | | |
| BeR$_2$ | 20.1 | 1.4 | 18.1 | | 3.8 | 15.5 | | | | | 4.5 |
| Be$_2$C | | 41.7 | | | | | | | | | 2.3 |
| Unknown | 9.7 | 6.6 | 0.2 | | 5.6 | 0.7 | | | | | 10.1 |

[1] In these experiments, the reaction was run in the two steps shown without opening the autoclave between steps.
[2] Starting material was product of Experiment V.

The data shown in Table II indicate the following conclusions:

High-quality beryllium hydride can be made by this method (Example VI). The conversion of alkyl to hydride is a function of time and temperature. Use of 150° C. even for very long periods fails to give maximum conversion since the rate becomes very slow at 150° C. when about 70 percent BeH$_2$ is reached (Example III). At 200° C., higher conversion is reached in a shorter time. Heating the alkyl directly to 200° C., i.e., skipping the 150° C. stage, results in low-purity BeH$_2$, large amounts of carbide and beryllium metal being formed (Example IV).

Examples V, VII and VIII demonstrate the advantages of temperature programming. It is evident from the table that conversions to beryllium hydride are high and those to beryllium carbide are low.

The application of the temperature programming concept is by no means limited to two temperature stages. In fact, when low hydrogen pressures are employed, low initial temperatures, and several temperature stages, are desirable if excessive amounts of impurities in the product are to be avoided. Thus, when a hydrogen pressure of 10,000 p.s.i. is used, an initial temperature of 150° C. and a two-stage process yield satisfactory results. However, when the hydrogen pressure is reduced to 2,000 p.s.i., an initial temperature of 125° C., combined with a four-stage reaction, is required for satisfactory conversion to beryllium hydride. The results of such a reaction are reported in Table II (Example VIII).

It should be noted that an increase in the scale of the reaction of this invention may increase the proportion of impurity in the product. This deleterious effect can be avoided by decreasing the temperature of the initial program stage, or by increasing the number of stages, or by both expedients.

EXAMPLE IX

Hydrogenolysis of diethylberyllium at 5,000 p.s.i.

This experiment was carried out in a manner similar to that of Examples III–VIII except for the reduced hydrogen pressure of 5,000 p.s.i. and reduced initial temperature of 125° C. Similar results were obtained.

The above examples have been presented by way of illustration and it is not intended to limit the scope of the invention thereby. Employing the procedures illustrated therein and the process of this invention, other organoberyllium reactants may be employed to produce the beryllium hydride product. Thus, the following reactants may be used, among others: diisopropyl beryllium, di-t-butyl beryllium, di-n-octyl beryllium, di-dodecyl beryllium, diphenyl beryllium, di - o - tolyl beryllium, di-2,4-xylyl beryllium, dimesityl beryllium, dicyclopentyl beryllium, dicyclohexyl beryllium, dicyclopentadienyl beryllium, dibenzyl beryllium, diphenethyl beryllium, and methyl phenyl beryllium. Other examples of organoberyllium reactants in which each organo group contains up to 12 carbon atoms and which are useful in the process of this invention will now be evident.

As indicated above, the hydrogen pressure employed in the reaction of this invention can range from less than 500 p.s.i. to more than 15,000 p.s.i. However, pressures in the range of 4,000 to 12,000 p.s.i. are preferred because these have been found to lead to realtively high conversion of the organoberyllium compound to beryllium hydride. Temperatures ranging from less than 125° C. to more than 225° C. may be employed successfully in the process of this invention, but temperatures in the range of 150 to 200° C. are preferred because of the higher yields associated therewith. Particularly preferred, however, is the application of the principle of temperature programming pointed out above, in accordance with which the reaction is carried out in two or more stages, the initial stage at a temperature from about 100° to about 150° C. and the final stage at a temperature not greatly exceeding 200° C., the initial stage being continued for a period sufficient to carry the hydrogenolysis to a stage generally corresponding to the formation of mono-organoberyllium hydride and the final stage for a period sufficient to achieve maximum conversion to beryllium hydride. The reaction time for the first stage, when a two-stage process is used, can vary from less than 3 to more than 6 hours, a period of 4 to 4½ hours being preferred because this appears sufficient to carry the reaction to the mono-organoberyllium hydride stage, and longer periods at this temperature do not appear to increase the conversion significantly. For the second stage, periods varying from less than 8 to more than 12 hours are suitable, periods of 9 to 11 hours being preferred because the shorter period is adequate to achieve maximum conversion which is not appreciably increased by the use of longer periods.

As indicated above, the reaction of this invention can be carried out in the presence or in the absence of solvents. The solvents, if used, may be any materials which have adequate solvent power for the reactants and are chemically inert with respect to the reactants and products and which are stable under the reaction conditions. Such solvents include saturated acyclic and cyclic hydrocarbons such as n-heptane, isooctane, n-dodecane, cetane, cyclopentane, methyl cyclopentane, methyl cyclohexane and the like, and fluorocarbons and fluorohydrocarbons such as 1-fluoro butane, perfluoro cyclopentane, perfluoro cyclohexane, perfluoro cycloheptane, fluoroform and the like; and mixtures of any of the foregoing. When solvents are used, the product beryllium hydride is invariably insoluble therein and is precipitated out during the course of the reaction. It is then readily isolated by filtering, washing the residue with pure inert solvent and drying the product.

The compound of this invention is a useful intermediate in chemical reactions. For example, it may be treated with ethylene to produce beryllium alkyls whose chain length varies with the reaction conditions. Also, as indicated above, it may be used as a catalyst for the polymerization of ethylene and other monomers.

What is claimed is:

1. A process for the preparation of beryllium hydride which comprises reacting a diorganoberyllium compound in which each organo group contains up to about 12 carbon atoms with hydrogen at a temperature in the range of from about 125° to about 225° C. and at a pressure in the range of from about 500 to about 15,000 p.s.i.

2. The process of claim 1 wherein said compound is a dialkyl beryllium.

3. The process of claim 1 wherein the pressure is in the range of from about 1,000 to about 15,000 p.s.i.

4. The process of claim 1 wherein the pressure is in the range of from about 10,000 to about 12,000 p.s.i.

5. The process of claim 1 wherein the temperature is in the range of from about 150° to about 200° C.

6. The process of claim 1 wherein the reaction is carried out in an inert organic solvent.

7. The process of claim 1 wherein the reaction is carried out in cyclohexane as a solvent.

8. The process of claim 1 wherein the reaction is carried out in cyclohexane as a solvent and wherein the temperature is in the range of from about 125 to about 225° C. and the pressure is in the range of from about 4,000 to about 10,000 p.s.i.

9. The process of claim 1 wherein the diorganoberyllium compound is diethylberyllium.

10. A process for the preparation of beryllium hydride which comprises reacting a dialkyl beryllium with hydrogen under a pressure in the range of from about 500 to about 15,000 p.s.i., the reaction being carried out at a temperature of from about 100° to about 150° C. for a period of from about 2 to about 6 hours after which the temperature is increased to about 200° C. and the reaction is continued for a period of from about 6 to about 14 hours.

11. The process of claim 10 wherein the pressure is in the range of from about 10,00 to about 12,000 p.s.i.

12. The process of claim 10 wherein the pressure is in the range of from about 4,000 to about 6,000 p.s.i.

13. The process of claim 10 wherein the pressure is in the range of from about 500 to about 2,500 p.s.i.

14. Th process of claim 10 wherein the reaction is carried out in an inert organic solvent.

15. The process of claim 10 wherein the reaction is carried out in cyclohexane as a solvent.

16. The process of claim 10 wherein the reaction is carried out in cyclohexane as a solvent and wherein the pressure is in the range of from about 4,000 to about 6,000 p.s.i.

17. A process for the preparation of beryllium hydride which comprises reacting an alkyl beryllium hydride compound in which the alkyl group contains up to about 12 carbon atoms with hydrogen at a temperature in the range of from about 150° to about 200° C. and at a pressure in the range of from about 1,000 to about 15,000 p.s.i.

18. A multi-stage process for the preparation of beryllium hydride which comprises reacting a diorganoberyllium compound in which each organo group contains up to about 12 carbon atoms with hydrogen under elevated temperature and pressure, the hydrogen pressure being in the range of from about 1,000 to about 15,000 p.s.i., the reaction temperature increasing from a value of about 125° C. in the initial stage to a value of about 200° C. in the final stage, the reaction temperature in each stage after the first being higher than that in the immediately preceding stage.

References Cited

UNITED STATES PATENTS 2,994,587  8/1961  Vose _____ 23—204

OTHER REFERENCES

Holly et al.: "The Preparation of the Hydrides of Magnesium and Beryllium," Los Alamos Report LA-1660, written 1954, pp. 1-8, 41-42 and 65.

CARL D. QUARFORTH, Primary Examiner

F. M. GITTES, Assistant Examiner

U.S. Cl. X.R.

423—647